US009135280B2

(12) United States Patent
Milenova et al.

(10) Patent No.: US 9,135,280 B2
(45) Date of Patent: Sep. 15, 2015

(54) GROUPING INTERDEPENDENT FIELDS

(71) Applicant: Oracle International Corporation, Redwood Shores, CA (US)

(72) Inventors: Boriana Lubomirova Milenova, Reading, MA (US); Marcos M. Campos, La Jolla, CA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 13/764,658

(22) Filed: Feb. 11, 2013

(65) Prior Publication Data

US 2014/0229482 A1    Aug. 14, 2014

(51) Int. Cl.
G06F 17/30    (2006.01)

(52) U.S. Cl.
CPC .................. *G06F 17/30289* (2013.01)

(58) Field of Classification Search
CPC ............ G06F 17/30598; G06F 17/30289
USPC .................................. 707/737, 802
See application file for complete search history.

(56) References Cited

U.S. PATENT DOCUMENTS

| 5,761,653 | A | 6/1998 | Schiefer et al. |
| 5,857,180 | A | 1/1999 | Hallmark et al. |
| 6,041,357 | A | 3/2000 | Kunzelman et al. |
| 6,092,062 | A | 7/2000 | Lohman et al. |
| 6,353,818 | B1 | 3/2002 | Carino, Jr. |
| 6,353,826 | B1 | 3/2002 | Seputis |
| 6,356,889 | B1 | 3/2002 | Lohaman et al. |
| 6,493,637 | B1* | 12/2002 | Steeg ............................. 702/19 |
| 6,618,719 | B1 | 9/2003 | Andrei |
| 7,167,848 | B2 | 1/2007 | Boukouvalas et al. |
| 7,480,663 | B2 | 1/2009 | Colossi et al. |
| 7,647,293 | B2* | 1/2010 | Brown et al. .......... 707/999.002 |
| 7,873,628 | B2 | 1/2011 | Gong et al. |
| 7,877,381 | B2 | 1/2011 | Ewen et al. |
| 8,818,991 | B2 | 8/2014 | Hagenbuch et al. |
| 2003/0065648 | A1 | 4/2003 | Driesch et al. |
| 2005/0038848 | A1 | 2/2005 | Kaluskar et al. |
| 2005/0102325 | A1* | 5/2005 | Gould et al. ............... 707/104.1 |
| 2005/0278355 | A1* | 12/2005 | Gonzalez ...................... 707/100 |
| 2006/0036617 | A1 | 2/2006 | Bastawala et al. |

(Continued)

OTHER PUBLICATIONS

Tatti, Nikolaj, "Maximum Entropy Based Significance of Itemsets", ICDM 2007, Omaha, NE, Oct. 28-31, 2007, pp. 312-321.*

(Continued)

*Primary Examiner* — Robert Stevens
(74) *Attorney, Agent, or Firm* — Hickman Palermo Becker Bingham LLP

(57) ABSTRACT

Processes, machines, and stored machine instructions are provided for grouping interdependent fields. Field grouping logic may include specially configured machines and/or stored instructions that identify group(s) of interdependent fields of a data set. The field grouping logic may receive, from a client on a customizable interface, a request for interdependent fields in a data set and, in response, cause generation of an output object that identifies the similar fields in the data set. The field grouping logic may exclude field(s) of the data set that are not interdependent, are not frequently accessed, or do not consume much space in storage, even though the request may not identify which fields are interdependent. The output object identifies the similar fields in set(s) or list(s) of fields, or in a hierarchy or hierarchies of groups and sub-groups.

28 Claims, 4 Drawing Sheets

(56) References Cited

U.S. PATENT DOCUMENTS

| | | |
|---|---|---|
| 2008/0098048 A1 | 4/2008 | Cao et al. |
| 2008/0133454 A1* | 6/2008 | Markl et al. ............... 707/2 |
| 2011/0153623 A1* | 6/2011 | Vo ........................... 707/752 |
| 2012/0310874 A1* | 12/2012 | Dantressangle et al. ...... 707/600 |

OTHER PUBLICATIONS

Ilyas, Ihab F., et al., "CORDS: Automatic Discovery of Correlations and Soft Functional Dependencies", SIGMOD 2004, Paris, France, Jun. 13-18, 2004, pp. 647-658.*

Cimiano, Philipp, "Chapter 6: Concept Hierarchy Induction", Ontology Learning and Population from Text: Algorithms, Evaluation and Applications, Springer, © 2006, pp. 85-184.*

Fan, Wenfei, et al., "Discovering Conditional Functional Dependencies", IEEE Transactions on Knowledge and Data Engineering, vol. 23, No. 5, May 2011, pp. 683-698.*

Merriam-Webster's Collegiate Dictionary, 10th Edition, Springfield, MA, © 1997, pp. 308-309 and 918.*

Jennifer G. Dy, "Feature Selection for Unsupervised Learning", Technical Report TR-CDSP-03-53 Department of Electrical and Computer Engineering, Northeastern University, 58 pages, Dec. 9, 2003.

C. Krier, "Feature clustering and mutual information for the selection of variables in spectral data" ESANN'2007 proceedings—European Symposium on Artifical Networks Bruges (Belgium), Apr. 25-27, 2007, ISBN 2-930307-07-02. 6 pages.

Pabitra Mitra, "Unsupervised Feature Selection Using Feature Similarity" IEEE Transactions on Pattern Analysis and Machine Intelligence, vol. 24, No. 4, Apr. 2002, 13 pages.

Li, Quanzhong, et al., "Adaptively Reordering Joins during Query Execution", ICDE dated 2007, Istanbul, Turkey, dated Apr. 15-20, 2007, pp. 26-35.

Antoshenkov et al., "Query Processing in Oracle Rdb", The VLDB Journal, vol. 5, Issue 4, dated Dec. 1996, pp. 229-237.

Aboulnaga, A. et al., "Automated Statistics Collection in DB2 UDB", International Conference on Very Large Data Bases (VLDB '04), Toronto, Canada, pp. 1146-1157, Aug. 2004.

* cited by examiner

GROUPING INTERDEPENDENT FIELDS

CROSS-REFERENCE TO RELATED APPLICATIONS

This application is related to the patent application Ser. No. 13/764,621, also filed on Feb. 11, 2013, the entire contents of which is hereby incorporated by reference as if fully set forth herein. This application is also related to the patent application Ser. No. 13/764,677, also filed on Feb. 11, 2013, the entire contents of which is hereby incorporated by reference as if fully set forth herein.

FIELD OF THE INVENTION

The present invention relates to grouping fields of data.

BACKGROUND

Many businesses live or die based on the efficiency and accuracy by which they can store, retrieve, process, and/or analyze data. "Data," as used herein, is digital information that is electronically stored on storage device(s). Data may be maintained on an individual storage device, such as a local hard disk or solid state drive, a CD-ROM, or a memory module. Alternatively, data may be distributed over multiple storage devices, such as storage devices that are working together to provide a cloud storage service or storage devices that are operating separately to store subsets of the data. One or more database servers may operate in parallel to provide read and/or write access to the data. Large sets of data, whether stored on one device or distributed among many devices, may consume a significant amount of storage space and/or processor time to store, retrieve, process, and/or analyze.

Data may be described in terms of fields and values. "Fields," as used herein, refer to containers or labels that provide contexts. "Values," as used herein, refer to information that is stored according to or in association with the contexts. For example, a single table may have many different columns that provide contexts for the values that are stored in the columns. The different columns may store different sets of data having different contexts, and the different sets of data may or may not be of different data types. In another example, a single document may have many attributes and/or elements that provide contexts for the values that are nested in the attributes and/or elements. Elements or attributes that share the same name, path, or other context may collectively store a set of data that shares the context. Different elements or attributes may store different sets of data having different contexts, and the different sets of data may or may not be of different data types.

To alleviate some of the overhead for storing, retrieving, processing, and/or analyzing large sets of data, some computer systems utilize metadata that is created and stored in association with the sets of data. "Metadata," as used herein, is data that describes other data. Metadata may describe data in a manner that allows the described data to be stored, retrieved, processed, and/or analyzed more efficiently or more accurately. For example, metadata for a given set of data may include a mean, median, mode, minimum, and/or maximum of the given set of data, such that these value(s) may be quickly retrieved without being recalculated each time the set of data is accessed. The metadata may be used to plan for data processing such that a data processor can effectively allocate resources for the data processing.

General statistics such as the mean, median, mode, minimum, or maximum value(s) may be helpful to plan for storing, retrieving, processing, and/or analyzing a set of data. However, these general statistics are of limited utility, especially when storing, retrieving, processing, and/or analyzing multiple sets of data that may or may not be meaningfully related to each other.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
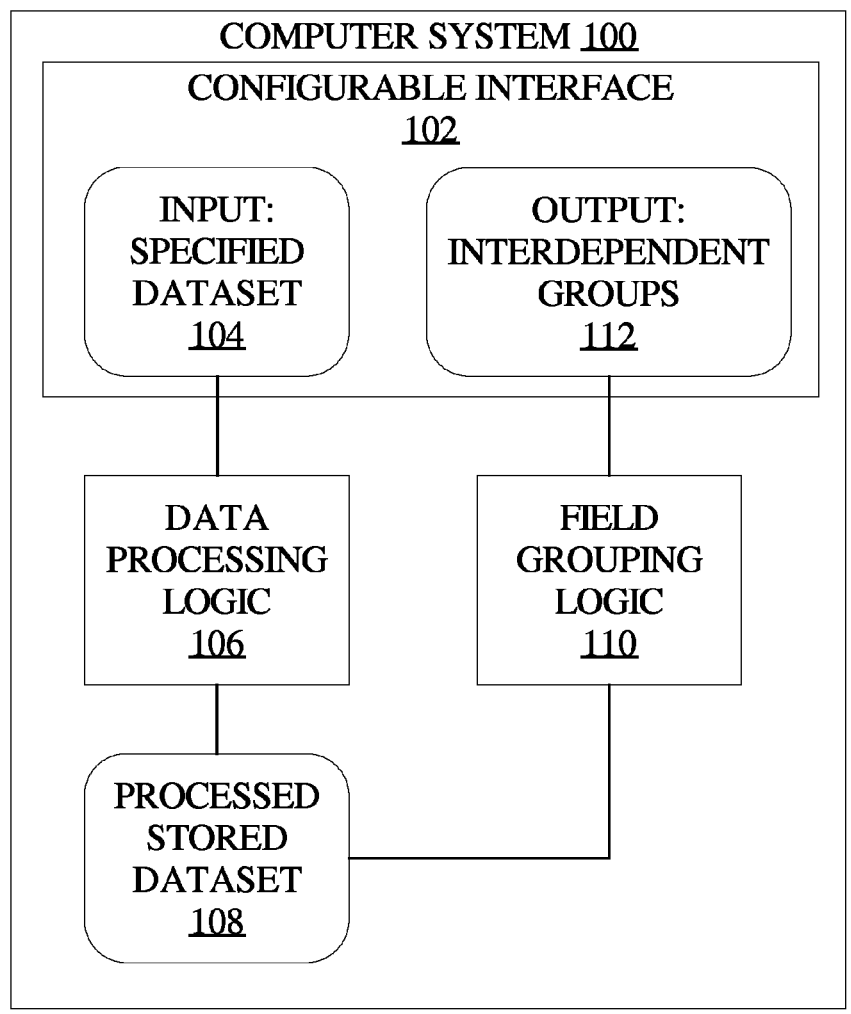
FIG. 1 illustrates an example system for grouping interdependent fields.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Various example machine-implemented methods, specially configured machines, and stored machine instructions are provided herein for grouping interdependent fields. Machines may be specially configured with logic comprising a combination of stored instructions, hard-wired instructions, and hardware including a processor for performing processes that include grouping interdependent fields. Fields are "interdependent" with each other if the fields vary in a similar manner, if the fields overlap in value distribution, or if the fields could be used to model each other without a significant loss of information. Field grouping logic may include specially configured machines and/or stored instructions that identify group(s) of interdependent fields of a data set based at least in part on levels of interdependence between the fields, how frequently the fields are accessed, and/or how much space is consumed by the fields in storage. The field grouping logic may receive, from a client on a customizable interface, a request for interdependent fields in a data set and, in response, cause generation of an output object that identifies the interdependent fields in the data set. The field grouping logic may exclude field(s) of the data set that are not interdependent, are not frequently accessed, or do not consume much space, even though the request may not identify which fields are interdependent. The request may reference the data set as a whole, either by explicitly identifying the data set as a parameter of the request or by implicitly referencing the data set by default. The output object identifies the interdependent fields in set(s) or list(s) of fields, or in a hierarchy or hierarchies of groups and sub-groups. In the hierarchies, different levels of groups or sub-groups may have fields that are similar to different degrees.

In one embodiment, the field grouping logic receives a request to determine which fields in a data set are interdependent with each other. The data set may include multiple fields such as at least a first field and a second field. The field grouping logic may determine levels of interdependence for pairs of fields either responsive to the request or during a preprocessing phase that occurs before the request is received and for which the results are cached. Different levels of interdependence may be determined between different fields. The field grouping logic may filter out pairs of fields that are not interdependent beyond a threshold level. Some of the fields, such as a pair of a first field and a second field, may have a high enough level of interdependence to be included in a group or sub-group of interdependent fields. Other fields, such as a pair of a third field and a fourth field or a pair of the first field and the third field, may not have a high enough level of interdependence to be included in the group or sub-group.

Determining levels of interdependence between the first field and second field may include, for at least a sample of the data set, measuring frequencies of co-occurrences of values in the first field and values in the second field. For the same or a different sample of the data set or for the entire data set, the field grouping logic may predict frequencies of co-occurrences of values in the first field and values in the second field based at least in part on measured frequencies of values in the first field and measured frequencies of values in the second field. For example, the predicted frequencies may be determined based on an assumption that the first field is independent of the second field. Based at least in part on the measured frequencies of co-occurrences and the predicted frequencies of co-occurrences, the field grouping logic computes a divergence score that reflects how divergent the fields are from each other. The field grouping logic may scale the divergence score based at least in part on a first number of values in the first field or a second number of values in the second field. For example, the field grouping logic may scale the divergence score based on the maximum possible value of the divergence Maximum divergence happens when all data is on the main diagonal of the grid evenly distributed. If the two dimensions are not equal, the maximum divergence corresponds to the log of the shorter dimension.

In response to a request for similar values, field grouping logic may identify group(s) of interdependent fields such as set(s), list(s), or a hierarchy or hierarchies of groups and subgroups of fields. For example, the field grouping logic may identify a group that includes at least a first field and a second field. In the same or another example, the field grouping logic may identify hierarchy that includes two or more sub-groups of interdependent fields. The two or more sub-groups may have a different level of interdependence between each other than the fields within each of the two or more sub-groups. For example, high level groups may have a medium level of interdependence between each other, and fields in lower-level sub-groups may have a high level of interdependence between each other. At the top level, the field grouping logic may look for fields or groups of fields that are interdependent with each other beyond a threshold level.

The thresholds may be raised for fields at lower levels in the hierarchy. For example, a group and subgroups of fields may be represented by a tree having three levels, a top-level root node representing the group of fields, one or more mid-level nodes representing one or more sub-groups of fields, and one or more leaf nodes representing one or more sub-groups of sub-groups of fields. Pairs of fields may be added to the group if they are interdependent beyond a first basic threshold, A. Of those pairs, sub-sets of pairs may be added to the one or more sub-groups if they are interdependent beyond a second threshold, B, which may be higher than A. Of the sub-sets of pairs in each sub-group, sub-sets of those sub-sets may be added to the one or more sub-groups of sub-groups if they are interdependent beyond a third threshold, C, which may be higher than both A and B.

In one embodiment, the field grouping logic utilizes a model that approximates a dataset. Once the data set has been modeled, the model itself may be used to estimate the occurrences of individual values in the data set or the co-occurrences of values in the dataset. If the model has been normalized, the model may be utilized to estimate sample value frequencies for individual fields or for pairs of fields. For example, density modeling logic may create a model that models frequencies of co-occurrence between values that occur in column A and values that occur in column B, as well as separate models that model frequencies of occurrence of values in column A and values in column B, respectively. The columns may be scored based on the degree of overlap between separate occurrences and co-occurrences, and columns having a high degree of overlap between separate occurrences and co-occurrences may be estimated to be interdependent.

In one example, a model may estimate that value W is approximately 25% of the values for field X, and value Y is approximately 10% of the values for field Z. If the data set is estimated to have 1000 records, then 250 of the records may be estimated to have value W for field X and 100 of the records may be estimated to have value Y for field Z. If field X and field Z are independent, the field grouping logic may estimate a probability of co-occurrence of 0.25*0.1, or 2.5%. In other words, using the model, it could be estimated that value W of field X co-occurs 25 times with value Y of field Z. If the values co-occur significantly more or less frequently in the actual data set, then field X and field Z may be predicted to be more or less dependent on each other.

In one embodiment, the field grouping logic accounts for more than mere interdependence among fields. For example, the field grouping logic may account for how frequently field(s) are accessed, such as when processing queries that request information from the field(s). Frequently accessed fields may be favored for inclusion into the group of interdependent fields. As another example, the field grouping logic may account for a size of the field. Larger fields may be favored for inclusion in the group of interdependent fields. Generating and using models for frequently accessed data may result in a greater overall efficiency (in terms of time and use of computing resources) than generating and using models less frequently accessed data if the models provide approximately the same level of benefit per use. Similarly, generating and using models for larger sets of data may result in a greater overall efficiency than generating and using models for smaller sets of data if, due to their size, the larger sets of data would otherwise take longer to process or analyze in the absence of the models.

The fields in the group may be the target of further optimization techniques. For example, density models may be built across fields in the group of fields, and these density models may be used to estimate amounts of resources that would be used to process queries on the rows. Building and using the density models for selected fields may lead to more significant gains in performance for fields that are frequently accessed and/or larger.

FIG. 1 illustrates an example system for grouping interdependent fields. As shown, the example system includes a configurable interface 102 for receiving input 104 and responding with output 112. The input 104 specifies a dataset, which is processed by data processing logic 106 to produce a processed stored dataset 108. Field grouping logic 110 selects a subset of fields from processed stored dataset 108 to be identified as interdependent groups of fields 112. Field grouping logic 110 then identifies the interdependent groups 112 for output from the configurable interface 102. Output 112 might not include the fields themselves, but merely identifiers or references to the fields. In one embodiment, the information such as flags or interdependency indicators are stored in association with the interdependent fields to indicate that the fields are interdependent with other field(s). The stored indications may identify the other fields with which the field is interdependent. In this embodiment, information might not be outputted in a reply message but instead is outputted as stored information.

Figure 2:
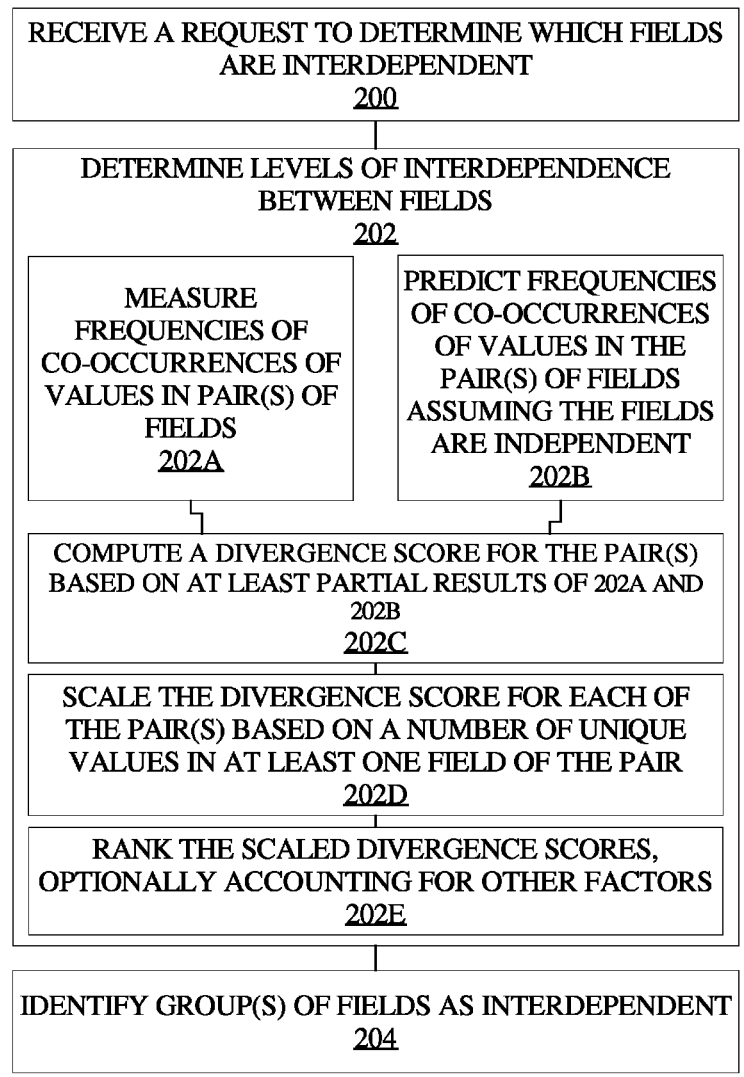
FIG. 2 illustrates an example process for grouping interdependent fields.

FIG. 2 illustrates an example process for grouping interdependent fields. In step 200, computing device(s) specially configured with field grouping logic receive a request to determine which fields are interdependent. In step 202, the field grouping logic determines levels of interdependence between fields. Step 202 may include example sub-steps 202A-202E. In step 202A, the field grouping logic measures frequencies of co-occurrences of values in pair(s) of fields. In step 202B, which may be performed serially or in parallel with step 202A, the field grouping logic predicts frequencies of co-occurrences of values in the pair(s) of fields assuming the fields are interdependent. In step 202C, the field grouping logic computes a divergence score for the pair(s) based on at least partial results of 202A and 202B. The divergence score for each of the pair(s) is scaled in step 202D based on a number of unique values in at least one field of the pair. In step 204, based on the levels of interdependence between fields computed in step 202, the field grouping logic identifies group(s) of fields as interdependent. Step 204 may be responsive to steps 200 and 202. In one example, the group(s) may be identified in a reply message to a client that sent the initial request. In another example, the group(s) are identified by storing indications in association with the grouped fields. A given indication stored in association with a given field may identify other fields with which the given field is grouped.

Initial Data Sampling, Processing, and Binning

Data may be initially processed to bin the data into manageable bins so statistics on the data can be quantified and compared.

In one embodiment, as fields are initially scanned, data processing logic keeps track of the minimum and maximum values of all numerical or date-related fields and computes frequency counts for all categorical fields. If the data is scanned by multiple data processors in parallel, local minimums and maximums may be combined and counts may be aggregated in a coordination stage between the data processors. In an initial data processing stage, the data processing logic may determine, output, and/or store the minimum and maximum values observed in all numerical or date-related columns, the frequency counts for all categorical fields, and the number of rows processed by each data processor. In another embodiment, the data processing logic does not keep track of some or all of these statistics.

In one embodiment, field grouping logic draws a random sample (for example, 2000 rows) of data for the purpose of grouping fields based on the sample. In the process of sampling, columns may be binned into bins that represent the most frequently occurring values or the most frequently occurring ranges of values. The data sample is used by the field grouping logic to perform field interdependency analysis. Using at least one sampling of the data, univariate histograms may be computed. The univariate histograms describe frequencies of individual data values in the fields.

Quantile Binning

In one embodiment, data processing logic computes bin boundaries for each field or column. Columns with intrinsic order (e.g., NUMBER, DATE) are handled by sorting the values and finding appropriate cut points. The data processing logic may also compute univariate column histograms for each column. As a data table is loaded, the data processing logic may scan the data table, binning the data on the fly, and store it in memory. The binned data may subsequently be used to compute bivariate histograms for each column pair.

The data sample may be stored in memory or in other temporary storage, and bin boundaries may be computed for the numerical or date-related columns using quantile binning.

Various date-related column types may be converted into doubles to simplify value ordering, for example, by using SQL expressions for columns stored in an Oracle database as follows:

Dates to_binary_double(to_number(to_char(col_name, 'J'))+to_number(to_char(col_name, 'SSSSS'))/86400)

Timestamps to_binary_double(to_number(to_char(col_name, 'J'))+to_number(to_char(col_name, 'SSSSS'))/86400+to_number(to_char(col_name, 'FF9'))/1e+9/86400)

Time to_binary_double(extract(hour from col_name*60*60+extract(minute from col_name)*60+extract(second from col_name))

Time interval year to month to_binary_double(extract(year from col_name)*12+extract(month from col_name))

Time interval day to second to_binary_double(extract(day from col_name)*24*60*60+extract(hour from col_name)*60*60+extract(minute from col_name)*60+extract(second from col_name))

For columns with intrinsic order, appropriate cut points may be determined using quantile binning based on frequencies of values. In one example, values are ordered by value, and group boundaries are defined at the ends of even or roughly even bins of values. In a simple example, each bin may hold approximately 25% of the values, with the first bin holding lower values and the last bin holding upper values.

In one embodiment, the field grouping logic stores an ordered list of the unique values for a particular column along with their counts. These values and counts may then be placed in an array and sorted by value. If there are fewer values than a specified or set minimum number of bins, all column values are retained as bin boundaries. If there are more rows than a specified or set maximum number of bin boundaries, a cumulative probability is computed for each value in the ordered list. Bin boundaries are formed as the values that match most closely with the desired quantiles. For example, if we ask for 10 bins, we would choose column values with corresponding cumulative probabilities of 0.1, 0.2, 0.3, etc.

In some cases, assigning bins based on cumulative probability does not achieve a desired numbers of bins because a given value spans more than one quantile. In one embodiment, the field grouping logic also adds, as bin boundaries, the most frequent column values (highest increase in cumulative probability) that are not already in the bin boundary list.

Finding the bin boundaries may be performed in a single scan through the ordered value list while maintaining two arrays of the bin boundary candidates. The first array stores bin boundaries that correspond to quantile cutoffs given the desired number of bins. The second array stores the most frequent values observed in the data that are not already in the first array.

As the ordered list is scanned, the field grouping logic initializes the second array with the first k values not used in the quantile cutoff array, where k is the desired number of bins. Subsequently, as the field grouping logic scans the ordered list, the field grouping logic replaces the array entry with lowest frequency if a more frequent value is encountered. The field grouping logic does not need to sort the array upon every insertion. Instead, a quick scan may be performed, and the index of the entry with lowest frequency is recorded.

Once the field grouping logic finishes scanning the ordered list, the field grouping logic checks if there are enough entries in the quantile bin boundary array. If there are too few entries, the most frequent array is sorted by frequency, and the most frequent values are added to the quantile bin boundary array. Finally, the field grouping logic sorts the resulting final bin boundaries by value. In quantile binning, any NULLs encountered during binning may be placed in a separate NULL bin. This bin may be the last in the list (has the highest bin id). Once the bin boundaries are finalized, the field grouping logic may compute a univariate histogram by computing the change in cumulative probability across the selected bin boundaries.

The field grouping logic may compute bin one field or column at a time. The data sample may be stored in a column oriented format, where adjacent cells in individual columns are adjacent to each other in physical storage, to allow efficient access. Once the bin boundaries are computed, the binned data may be stored in a row-oriented format, where adjacent cells in individual rows are adjacent to each other in physical storage, to facilitate contiguous data access during the interdependency analysis stage.

Binning numerical or date-related columns may result in a significant amount of data compression for values that consume a significant amount of storage. Instead of storing multiple larger data values, a bin number may be maintained for each bin that represents a range of larger data values.

Categorical Top-N Binning

The bin boundaries may not be strictly quantile in the cases when the data distribution and/or the number of unique values do not allow precise quantization. Columns without intrinsic order (e.g., CHAR, NCHAR) use categorical top-N binning.

For columns without an intrinsic order, top-N bins may be identified on the basis of the categorical frequencies of different categories of values. The top-N values are retained as the top-N values for the field. All other values fall within a catch-all 'other' bin. NULL values may be among the most frequent. If not, they are counted in the 'other' bin. After initial processing statistics have been aggregated, coordinating logic may determine, output, and/or store minimum and maximum values for all numerical or date-related columns, top-N bin values for all categorical fields, and/or a total number of rows in the data.

For top-N bin boundaries, the data processing logic may execute a command to determine the resulting boundary values, which may be loaded in memory. The boundary values may be stored in a hash table. The hash key may be made of column id and column value. To avoid using a disk-aware hash table, the hash key size may be reduced by hashing the column value into a number. An example SQL command for determining boundary values is:

SELECT col_name, cnt FROM (SELECT col_name, cnt, DENSE_RANK( )OVER(ORDER BY cnt DESC) rnk FROM (SELECT ORA_HASH(col_name) col_name, count(*) cnt FROM data GROUP BY col_name))

where rnk<25 order by rnk, col_name;

In the case of ties, this query may produce more rows than required. The set may be further size-limited with a fetch function that fetches only N rows from the result set.

In one example, a sample of 2000 rows of data represents a sampling fraction of: 2000 divided by the total row count on the data. A row case id or some other row identifier may be hashed before applying a row selection technique such that the technique selects random rows for the sample. The sample data may be categorically binned by assigning the sample data to the top-N bins, which may be determined based on value frequencies. Values that do not fall within the most frequent bins may be mapped to the 'other' bin.

Scoring Pairs of Fields

In one embodiment, the field grouping logic compares fields by determining a KLD score or a scaled KLD score between the fields. The KLD score measures an amount of information that is lost when one field is used to approximate another field. In one embodiment, if the amount of lost information is below a threshold for two fields, then the fields may be grouped together as interdependent. On the other hand, if the amount of lost information is above a threshold for two fields, then the fields are not grouped together as interdependent. In another embodiment, the grouping is based on a function that accounts for the KLD score or scaled KLD score and one or more other factors.

In one embodiment, the field grouping logic scores pairs of fields based on their similarities or differences. Scored pairs may be filtered to produce a set of similar fields and/or ranked to produce an ordered set of similar fields.

In one embodiment, the field grouping logic computes a full set of bivariate histograms by performing a single scan through the build data. However, performing the single scan may consume a significant amount of memory to store the bivariate histograms.

In an alternative embodiment, the field grouping logic computes bivariate histograms for pairs of fields by performing multiple in-memory scans of binned data. For each field (column), the field grouping logic scans the binned data and computes that field's bivariate histograms with all other fields. In one embodiment, scanning the binned data and computing the field's bivariate histograms uses at most $\max_i(\text{bin\_cnt}(i))*(\Sigma_i \text{bin\_cnt}(i)-\max_i(\text{bin\_cnt}(i)))$
counters, where bin_cnt(i) is the number of bins for field i.

Two attributes may be considered interdependent if their joint distribution violates the independence assumption. To test whether the independence assumption is violated, we compare the empirical bivariate distribution (actual cell frequency in the bivariate histograms) with the theoretical bivariate distribution (estimated frequency) given by the independence assumption. The theoretical distribution is calculated by computing the bin frequency based on the univatiate histograms.

The divergence score for a pair of fields may be proportional to a number of combinations of values in the pair. The divergence score may be higher for fields that are more divergent and lower for fields that are less divergent. In one example, the divergence score for a pair of fields is based at least in part on a sum of, for each combination of values in the pair, a measured frequency of co-occurrence of the combination of values multiplied by a logarithm of the measured frequency of co-occurrence denominated by the predicted frequency of co-occurrence of the combination of values. In a particular example, the field grouping logic computes a Kullback-Leibler divergence ("KLD") score to measure the difference between the empirical and theoretical distributions: $KLD=\Sigma_i p_i \log(p^i/q_i)$, where i is indexing individual cells in a bivariate histogram for the pair of fields, $p_i$ is the empirical frequency of value co-occurrences and $q_i$ is the theoretical frequency based on the assumption that the pair of fields are independent from each other.

Divergent scores for different pairs of fields may be scaled differently. For example, divergent scores for pairs of fields with higher numbers of unique values may initially be higher than divergent scores for pairs of fields with lower numbers of unique values. In one embodiment, the divergent scores for pairs of fields are measured as a fraction of a maximum possible value for the divergent scores. In another embodiment, the divergent scores for pairs of fields with higher numbers of unique values are scaled down to a greater degree or scaled up to a lesser degree than the divergent scores for pairs of fields with lower numbers of unique values. Alternatively, the divergent scores for pairs of fields with higher numbers of unique values may be scaled down, and the divergent scores for pairs of fields with lower numbers of unique values may be scaled up. By applying a common scaling technique using a same scaling formula to scale different divergent scores by different amounts for different pairs of fields that have different numbers of unique values, fields having different varieties of values may be meaningfully compared to each other to make a determination regarding the relative levels of interdependence among the fields.

In one example, high values of the KLD metric correspond to attribute pairs where the joint distribution violates the independence assumption. An example threshold formula provides an example cutoff level for determining whether or not a pair is interdependent. Below that level, the difference between distributions is likely to be due to chance rather than interdependence. For each pairwise distribution the example threshold is computed as follows: $thresh=-0.00354459572274*\ln(N)^4+0.09648020989078*\ln(N)^3-0.98953164715723*\ln(N)^2+4.54347178235177*\ln(N)-7.92165701102478$, where N is the number of sample rows. Other threshold formulas may be derived by fitting equations to the data. For example, the divergence distribution for multiple random attribute pairs may be modeled, corresponding to the NULL hypothesis that the 2 fields are independent. For a level of confidence (such as 95%), this distribution can be used to find the appropriate threshold levels. The formula may represent a numerical fit to the observed values for different sample sizes (N). Other thresholds, such as fixed or variable thresholds, may also be used in other examples.

The formula was fitted under the assumption that there are enough data rows to provide an average of 20 rows per grid cell. If there are fewer cells in a particular grid due to the low cardinality of that pair of attributes, the field grouping logic may rescale N up to account for the higher counts in the grid cells: $N=N*max\_bins/bins$. Due to the relatively small number of bins used per attribute, the described formula may be used for small sample sizes. For larger samples, such as any sample above 2,000 rows, the threshold asymptotes to a fixed minimum threshold of 0.02. This fixed minimum threshold may be used for larger samples rather than computing a formula that varies based on the sample size.

Grouping Interdependent Fields

The field grouping logic may group interdependent fields. Fields may be added to a group if they have at least a threshold level of interdependence with each other, if the fields are frequently accessed, and/or if the fields consume a significant amount of space in storage. These factors may cause the groupings to be more useful for a given pair of fields. For example, query optimization may realize significant performance gains in the presence of models for fields that are highly interdependent, frequently accessed, or large and difficult to analyze. If a large field is in a group of interdependent fields, the large field may be analyzed using information about a highly interdependent smaller field in the group in place of information about the large field. A server may also create more models and store more metadata for the grouped fields in light of the possibility that those models or metadata may be applicable to multiple fields.

Pairs of fields that are not interdependent may be filtered out of a group or groups of fields that are interdependent. Fields that do not have at least a threshold level of interdependence may be excluded from the group(s), and fields that do have at least the threshold level of interdependence may be included in the group(s).

In one embodiment, the field grouping logic may also or alternatively keep track of, output, or store information that identifies the fields that were not grouped as interdependent with any other fields. When analyzing the fields that are grouped or identified as not interdependent, these fields may be treated as independent. In other words, the probability of values co-occuring in the fields may be the multiplicative combination of the probabilities of the values occurring in each of the fields separately. Univariate histograms may be maintained for these fields that are not interdependent even if they are not selected to be part of any bivariate histograms.

In one embodiment, the field grouping logic receives a request to identify interdependent fields in a set of data and, in response to the request, passes back a subset of the fields to effectively filter the set of data. The request may explicitly identify the set of data, for example, by naming specific columns or tables in a database or by naming a key value that defines the set of data. Alternatively, the request may implicitly reference a default set of data such as all data stored on a particular device all data accessible by a particular user.

In one embodiment, the field grouping logic uses agglomerative hierarchical clustering on the pairs of fields to discover groups of more than two fields. The agglomerative clustering technique uses a bottom up approach for building groups of interdependent fields. Each pair of interdependent fields forms a group if the fields are interdependent beyond a threshold level. A group of more than two interdependent fields may be created when other groups are merged together. For example, fields A, B, and C may be grouped together in one group if fields A and B are grouped together, fields B and C are grouped together, and fields A and C are grouped together. In the example, all fields in the merged group may be interdependent with each other beyond a threshold level. In another example, interdependent fields are paired but not merged together into larger groups. In yet another example, a level of interdependency is determined between pairs, and one or more other factors contribute to a determination as to whether fields should be added to a group of fields.

Discovering attribute interdependencies and ranking fields on the basis of interdependencies may have a profound impact on the quality and performance of many data analysis methods. Focusing the analysis on the most meaningful subset of fields can significantly decrease the memory, storage, and computational requirements while improving the overall quality and robustness of the analysis results.

In one example, a client receives groups of interdependent fields and removes, from further analysis, fields that are redundant or highly interdependent. In this manner, the client may reduce usage of storage and computational resources for any follow up analysis. In another example, the client uses the groups of interdependent fields to identify meaningful field subspaces and produce specialized statistical models that are more accurate and scalable.

In one embodiment, the field grouping logic computes a ranked list of interdependent fields on the basis of the pairwise interdependency matrix. For each field, the field grouping logic may compute a rank-weighted mean interdependency where the pairwise interdependencies are weighted by the inverse of their rank. The interdependency of the jth column may be given by: $\text{Inter}_j = \Sigma_i(\text{KLD}_{ji}/i)/\Sigma_i(1/i)$, where i is the rank of the fields according to the KLD pair-wise interdependency with the jth column.

In one embodiment, the field grouping logic ranks interdependent fields based on a combination of factors, one of which may be the interdependency between the fields. Other factors may include the frequency by which the field is accessed by queries or the amount of space the field consumes in storage. These factors may be combined and weighted in any manner. In one example, the individual factors are multiplied by their respective weights and summed to produce a final score that is ranked. In one embodiment, the field grouping logic considers these other factors only for those fields that are interdependent beyond a threshold level. In another embodiment, the field grouping logic only measures interdependency for those fields that are frequently accessed and/or of a significant size.

The resulting field interdependency list may then be thresholded and/or filtered to eliminate statistically insignificant interdependencies, fields that are infrequently accessed, and/or fields that are very small in size. If there are many significantly interdependent fields remaining, the list may be further filtered by applying a maximum number of interdependent fields cap, which may be customized by a user via a settings interface.

Configurable Interface for Grouping Fields

A configurable interface may receive a request associated with the designated set of data and, in response to the request, cause generation of an output object that identifies similar fields. The interface may be a graphical user interface that receives user input requesting field groupings for a set of data. In response to the user input, the graphical user interface may cause display of information from the output object that identifies similar fields in the set of data. The output object may be generated on-the-fly, in response to the user's request. Alternatively, all or at least some of the output object may be prepared before the user's request and retrieved in response to the user's request.

In one embodiment, the interface is an application programming interface specially configured to perform field grouping actions in response to input that references a data set, either expressly or implicitly. The data set may be expressly referenced using an object or table identifier and/or a key value such as "region=West". The data set may be implicitly referenced without including, in the request, any information that is specific to the data set. For example, Table 2 may always be used for field grouping actions. As another example, grouping actions may by default be performed on all tables that are stored in a particular system such as a local system that received the field grouping request, or all tables that are accessible to a particular user, such as the user who makes the field grouping request.

Figure 3:
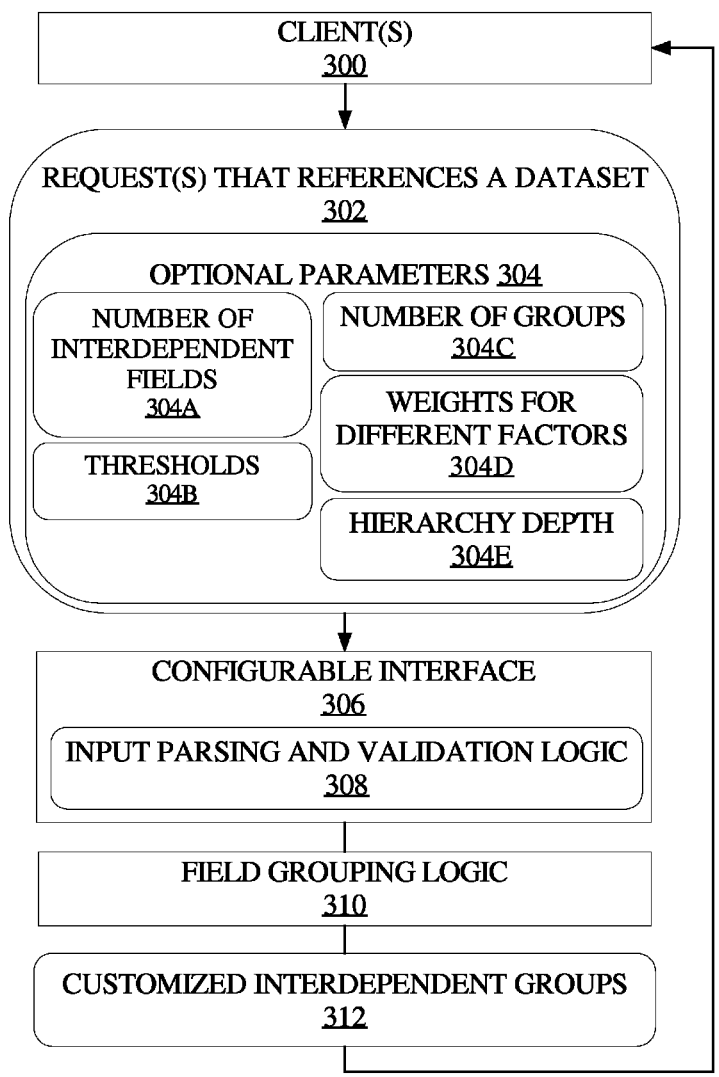
FIG. 3 illustrates an example configurable interface for grouping interdependent fields.

FIG. 3 illustrates an example configurable interface for grouping interdependent fields. As shown, client(s) 300 may send requests 302 to configurable interface 306. The requests 302 may reference a dataset, either implicitly by default or explicitly by specifying identifying information. The requests may also specify optional parameters 304 such as a number of interdependent fields 304A, thresholds 304B, a number of groups 304C, weights for different factors 304D, and/or a hierarchy depth 304E. The parameters 304 may specify what type of input of a plurality of accepted types of inputs should be expected by configurable interface 306, how the field grouping logic 310 should compute or filter the groups of interdependent fields, and what type of output of a plurality of possible types of outputs are expected by client(s) 300.

In the example of FIG. 3, input parsing and validation logic 308 of configurable interface 306 may parse and validate the request(s) 302 received from client(s) 300. Configurable interface 306 may then coordinate with field grouping logic 310 to generate an output of customized interdependent groups 312, which may be returned to client(s) 300.

For example, field grouping logic 310 may cap the output 312 at a maximum specified number of interdependent fields 304A or number of groups 304C, or may add to the output 312 until a minimum specified number 304A or 304C is met.

As another example, field grouping logic 310 may apply the thresholds 304B to determine the levels of interdependency, frequency by which the field is accessed, and/or sizes of the fields that are required before the fields are added to the output 312.

In yet another example, field grouping logic 310 may weigh different factors according to the specified weights 304D. For example, levels of interdependency may be given a higher weight than the frequency by which the field is accessed and/or the sizes of the fields. In other embodiments, levels of interdependency may be given a lower weight than or a same weight as these other factors.

The request 302 may also specify a hierarchy depth 304E that is used by the field grouping logic to set a minimum and/or maximum depth of a hierarchical set of groups. For example, if the maximum hierarchy level is set to 4, the output 312 may include great grandparent groups that include grandparent groups that are interdependent to a first degree, grandparent groups that include parent groups that are interdependent to a second degree, parent groups that include child groups that are interdependent to a third degree, and child groups that include fields that are interdependent to a fourth degree. Cutting the maximum hierarchy level to 3, for example, would eliminate the great grandparent groups.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
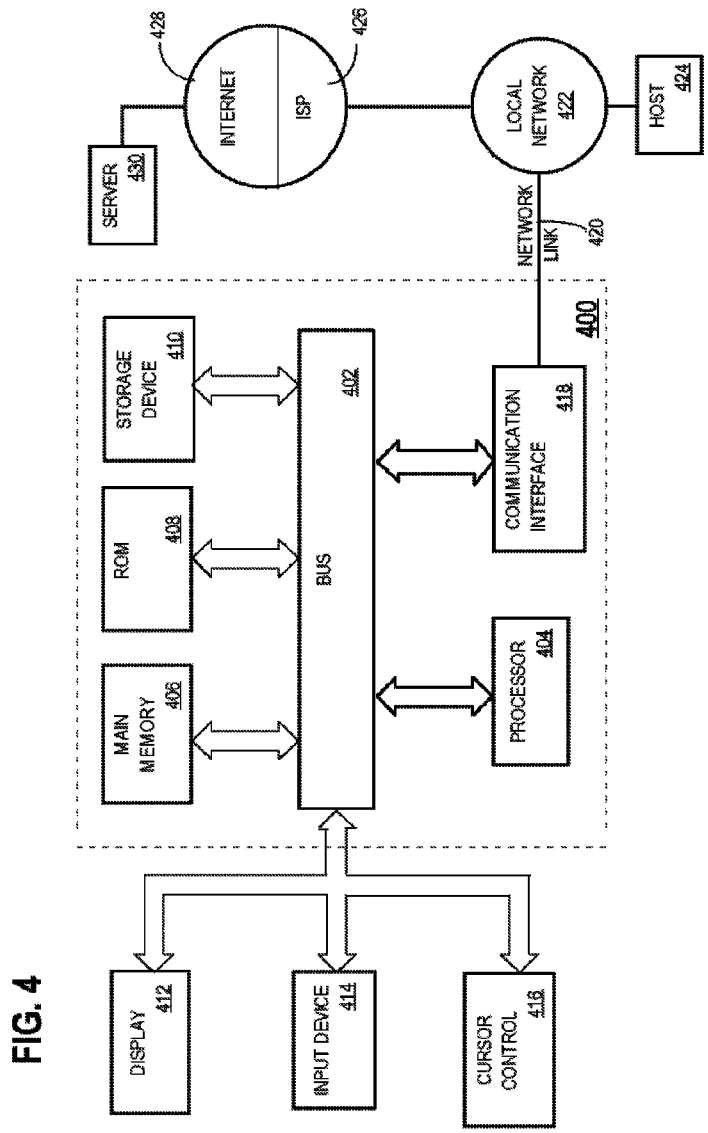
FIG. 4 illustrates an example computer system for performing various techniques described herein, such as the example process of FIG. 2.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

As used herein, the terms "first," "second," "third," "fourth," and "particular" are naming conventions that are used to introduce and reference members of a set of items. Unless otherwise expressly indicated, these terms are not intended to provide any ordering information about the members in the set. For example, a "first" item may or may not be at a beginning of a set of items, and may or may not be before a "second" item in the set, even if the set is referred to as a "list" or some other ordered arrangement of items.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method
for determining which fields, of a plurality of fields in a data set, are interdependent, comprising:
determining different levels of interdependence between different pairs of fields of the plurality of fields at least in part by, for each pair of the different pairs of fields:
for a respective sample of the data set in said each pair:
computing respective measured frequencies of co-occurrences of values in said each pair,
computing respective predicted frequencies of co-occurrences of values in said each pair based at least in part on measured frequencies of values in each separate field of said each pair;
computing a respective divergence score that measures how divergent values are in the separate fields of said each pair based at least in part on the respective measured frequencies of co-occurrences and the respective predicted frequencies of co-occurrences;
determining a maximum divergence score among respective divergence scores computed by said computing a respective divergence score for each pair of said different pairs;
scaling the respective divergence score based at least in part on the maximum divergence score to a respective scaled divergence score that is different from the respective divergence score; and
identifying a group of fields as interdependent based on said levels of interdependence between different pairs of fields.

2. The method of claim 1, wherein the group comprises a hierarchy that includes two or more sub-groups of interdependent fields, wherein the two or more sub-groups have a different level of interdependence than the fields within each of the two or more sub-groups.

3. The method of claim 1, wherein the plurality of fields comprises a first field, a second field, and a third field; wherein the group comprises the first field and the second field and excludes at least the third field.

4. The method of claim 1, wherein the maximum divergence score for a particular pair, of said different pairs of fields, comprising a first field and a second field, is based at least in part on a first number of unique values in the first field or a second number of unique values in the second field.

5. The method of claim 1, wherein the respective divergence score for a particular pair, of said different pairs of fields, comprising a first field and a second field, is based at least in part on a sum of:
for each combination of values in the first field and values in the second field, a measured frequency of co-occurrence of said each combination of values multiplied by a logarithm of:
the respective measured frequency of co-occurrence denominated by
the respective predicted frequency of co-occurrence of said each combination of values.

6. The method of claim 1, wherein, for a particular pair of said different pairs, before scaling the respective divergence score, the respective divergence score is proportional to the maximum divergence score.

7. The method of claim 1, wherein the plurality of fields comprises a first field, a second field, and a third field; wherein the group comprises the first field and the second field and excludes at least the third field; wherein determining the levels of interdependence comprises:
determining a first level of interdependence between the first field and the second field;
determining a second level of interdependence between the first field and the third field;
determining that the first level of interdependence satisfies a threshold level of interdependence and the second level of interdependence does not satisfy the threshold level of interdependence.

8. The method of claim 1, wherein the group is a first group, further comprising identifying a second group of fields as interdependent based at least in part on the levels of interdependence, wherein the second group includes different fields of the plurality of fields than the first group.

9. The method of claim 1, wherein, for each pair of the different pairs, the respective divergence score for said each pair accounts for measured frequencies of co-occurrences and predicted frequencies of co-occurrences of values in said each pair.

10. The method of claim 1, wherein the group of interdependent fields is identified based at least in part on how frequently at least one field in the group is accessed.

11. The method of claim 1, further comprising automatically selecting the plurality of fields from the data set based at least in part on how frequently fields in the data set are accessed.

12. The method of claim 1, wherein the group of interdependent fields is identified based at least in part on a size of at least one field in the group.

13. The method of claim 1, further comprising automatically selecting the plurality of fields from the data set based at least in part on sizes of fields in the data set.

14. The method of claim 1, further comprising, in response to identifying the group, generating one or more density models that approximate values of fields in the group.

15. One or more non-transitory storage media storing instructions which, when executed by one or more computing devices, cause
determining which fields, of a plurality of fields in a data set, are interdependent and comprise instructions which, when executed by the one or more computing devices further cause performance of steps comprising:
determining different levels of interdependence between different pairs of fields of the plurality of fields at least in part by, for each pair of the different pairs of fields:
for a respective sample of the data set in said each pair:
computing respective measured frequencies of co-occurrences of values in said each pair,
computing respective predicted frequencies of co-occurrences of values in said each pair based at least in part on measured frequencies of values in each separate field of said each pair;
computing a respective divergence score that measures how divergent values are in the separate fields of said each pair based at least in part on the respective measured frequencies of co-occurrences and the respective predicted frequencies of co-occurrences;

determining a maximum divergence score among respective divergence scores computed by said computing a respective divergence score for each pair of said different pairs;

scaling the respective divergence score based at least in part on the maximum divergence score to a respective scaled divergence score that is different from the respective divergence score; and identifying a group of fields as interdependent based on said levels of interdependence between different pairs of fields.

16. The one or more non-transitory storage media of claim 15, wherein the group comprises a hierarchy that includes two or more sub-groups of interdependent fields, wherein the two or more sub-groups have a different level of interdependence than the fields within each of the two or more sub-groups.

17. The one or more non-transitory storage media of claim 15,
wherein the plurality of fields comprises a first field, a second field, and a third field;
wherein the group comprises the first field and the second field and excludes at least the third field.

18. The one or more non-transitory storage media of claim 15,
wherein the maximum divergence score for a particular pair, of said different pairs of fields, comprising a first field and a second field, is based at least in part on a first number of unique values in the first field or a second number of unique values in the second field.

19. The one or more non-transitory storage media of claim 15, wherein the respective divergence score for a particular pair, of said different pairs of fields, comprising a first field and a second field, is based at least in part on a sum of:
for each combination of values in the first field and values in the second field, a measured frequency of co-occurrence of said each combination of values multiplied by a logarithm of:
the respective measured frequency of co-occurrence denominated by
the respective predicted frequency of co-occurrence of said each combination of values.

20. The one or more non-transitory storage media of claim 15, wherein, for a particular pair of said different pairs, before scaling the respective divergence score, the respective divergence score is proportional to the maximum divergence score.

21. The one or more non-transitory storage media of claim 15, wherein the plurality of fields comprises a first field, a second field, and a third field; wherein the group comprises the first field and the second field and excludes at least the third field;
wherein determining the levels of interdependence comprises:
determining a first level of interdependence between the first field and the second field;
determining a second level of interdependence between the first field and the third field;
determining that the first level of interdependence satisfies a threshold level of interdependence and the second level of interdependence does not satisfy the threshold level of interdependence.

22. The one or more non-transitory storage media of claim 15, wherein the group is a first group, wherein the instructions, when executed, further cause identifying a second group of fields as interdependent based at least in part on the levels of interdependence, wherein the second group includes different fields of the plurality of fields than the first group.

23. The one or more non-transitory storage media of claim 15, wherein, for each pair of the different pairs, the respective divergence score for said each pair accounts for measured frequencies of co-occurrences and predicted frequencies of co-occurrences of values in said each pair.

24. The one or more non-transitory storage media of claim 15, wherein the group of interdependent fields is identified based at least in part on how frequently at least one field in the group is accessed.

25. The one or more non-transitory storage media of claim 15, wherein the instructions, when executed, further cause automatically selecting the plurality of fields from the data set based at least in part on how frequently fields in the data set are accessed.

26. The one or more non-transitory storage media of claim 15, wherein the group of interdependent fields is identified based at least in part on a size of at least one field in the group.

27. The one or more non-transitory storage media of claim 15, wherein the instructions, when executed, further cause automatically selecting the plurality of fields from the data set based at least in part on sizes of fields in the data set.

28. The one or more non-transitory storage media of claim 15, wherein the instructions further cause, in response to identifying the group, generating one or more density models that approximate values of fields in the group.

* * * * *

UNITED STATES PATENT AND TRADEMARK OFFICE
CERTIFICATE OF CORRECTION

PATENT NO. : 9,135,280 B2
APPLICATION NO. : 13/764658
DATED : September 15, 2015
INVENTOR(S) : Milenova et al.

It is certified that error appears in the above-identified patent and that said Letters Patent is hereby corrected as shown below:

On title page 2, column 2, item [56] line 7, delete "Artifical" and insert -- Artificial --, therefor.

In the specification

Column 8, lines 57-58, delete "univatiate" and insert -- univariate --, therefor.

Column 9, line 5, delete "$\log(^{p_i}/_{q_i})$," and insert -- $\log(p_i/q_i)$, --, therefor.

Column 10, line 25, delete "co-occuring" and insert -- co-occurring --, therefor.

Column 11, line 58, delete "may by" and insert -- may be --, therefor.

Signed and Sealed this
Twenty-fourth Day of May, 2016

Michelle K. Lee
*Director of the United States Patent and Trademark Office*